Nov. 22, 1949     E. M. HARTER     2,489,130
RADIANT HEATING SYSTEM
Filed July 17, 1947     3 Sheets-Sheet 1

Inventor
Elson M. Harter.

By Murray, Sackhoff & Paddack.
Attorneys.

Nov. 22, 1949 — E. M. HARTER — 2,489,130
RADIANT HEATING SYSTEM
Filed July 17, 1947 — 3 Sheets-Sheet 2

Inventor
Elson M. Harter
By Murray, Sackhoff & Paddack
Attorneys

Nov. 22, 1949  E. M. HARTER  2,489,130
RADIANT HEATING SYSTEM
Filed July 17, 1947  3 Sheets-Sheet 3

Inventor
Elson M. Harter
By Murray, Sackhoff & Paddack
Attorneys

Patented Nov. 22, 1949

2,489,130

UNITED STATES PATENT OFFICE 2,489,130

RADIANT HEATING SYSTEM

Elson M. Harter, Blue Ash, Ohio

Application July 17, 1947, Serial No. 761,603

9 Claims. (Cl. 257—3)

The present invention relates to the heating of buildings, for example residential structures, by means of radiant heat.

An object of the invention is to provide a building structure and a self-contained radiant heating system for affording selected temperature conditions within closely controlled limits throughout the several seasons.

Another object of the invention is to provide a building structure with a heating system which provides practically uniform radiant heat to the floor or ceiling, or both floor and ceiling, of any or all rooms or apartments in a single or multi-storied building.

Still another object of the invention is to provide a building structure with a radiant heating system that is quickly and effectively responsive to heat demands and which is arranged to effectively cut off delivery of radiant heat to the rooms when required, to maintain a desired room temperature and prevent the personal discomforts of heat over-runs in mild weather.

A further object of the invention is to provide an improved wall-to-wall radiant heating system for buildings and an arrangement of building construction elements cooperating therewith to render it efficient and economical in operation, and relatively simple and inexpensive to construct.

A still further object is to provide means for accomplishing the aforementioned objects automatically and without waste of space within the building.

These and other objects are attained by the means described herein and exemplified in the accompanying drawings in which.

The use of non-luminous radiant heat for heating buildings is known in many forms amongst which are found various arrangements of sinuously disposed steam or hot water pipes embedded in cast cementitious floors and/or wall slabs. Objections to the latter arrangement are chiefly those of retarded delivery of radiant heat to the rooms when the system and building structure are cold, and the inability to retard the continued radiation after satisfying a small heat demand in the milder seasons of the year. Moreover, these systems make no provisions for supplying fresh air to the occupants, so that fresh air is sometimes lacking and at other times is supplied at the expense of comfortable room temperature. The embedded pipe systems are often practically unsatisfactory because of lack of uniformity of heat distribution due to long pipes and the location thereof.

The embodiment of the invention herein illustrated contemplates, in addition to its effectiveness, the building of the heating system into a house during construction but the broader aspects of the invention will not preclude the addition of such a system to an existing construction under certain circumstances.

Figure 1:
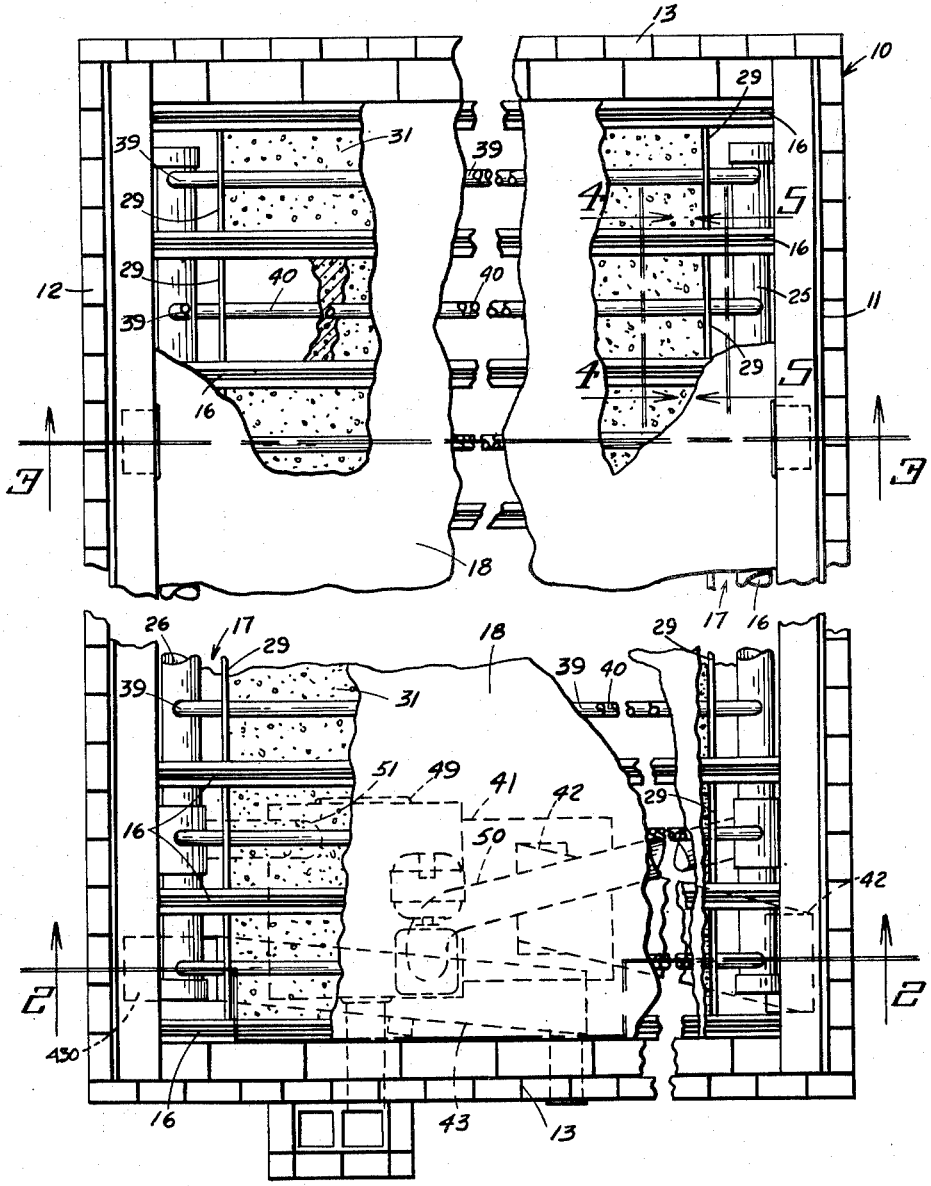
Fig. 1 is a horizontal fragmental sectional view of a building structure embodying a radiant heating system of the invention, parts being broken away.

Fig. 1 shows, by way of example, a building structure 10 having longitudinal side walls 11 and 12, and end walls 13, all of the well-known brick and cinder block construction.

Each of the side walls 11 and 12 has a longitudinal channel, 14 formed therein at each floor level resulting from the omission of the requisite number of courses of the blocks 15.

Metal joists 16 of special end construction are entered endwise into channels 14 at suitable intervals along said channels.

The ends of joists 16 are constructed to provide support for the end of the joist on the bottom horizontal side wall of the channel 14 without appreciably obstructing the longitudinal continuity of said channel 14, so that the said channel may form, in the finished building structure, a part of a combined air duct and pipe receiving duct, indicated generally at 17, located between the levels of a given floor 18 and the ceiling 19 below it and disposed partly within and partly outside the body of the supporting building side wall 11 or 12. (See Figs. 2 and 3.)

Joists 16 may be formed of top and bottom chords 20 and 21, each chord comprising a pair of angle irons, 22, secured to suitably constituted web forming members 23.

Figure 3:
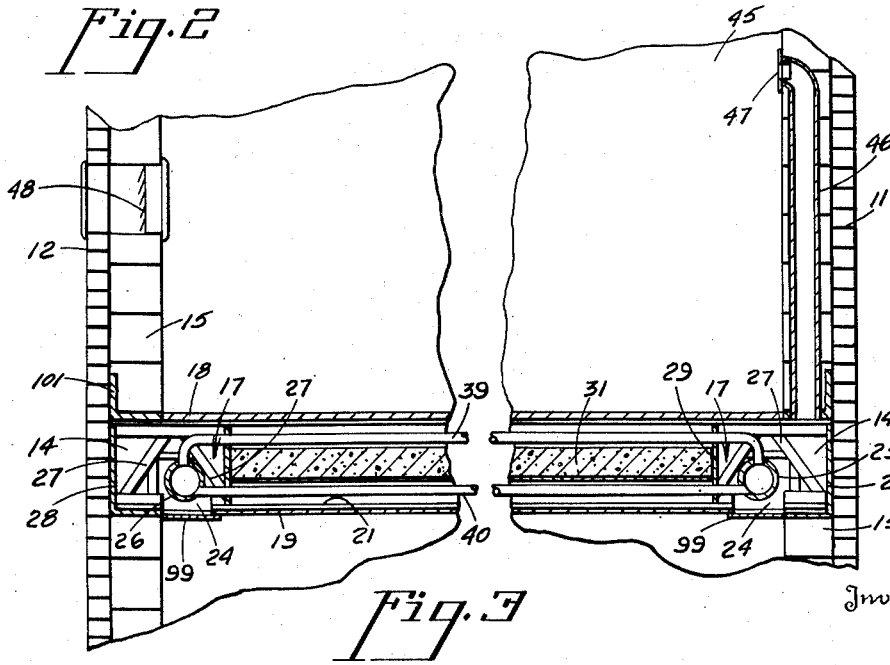
Fig. 3 is a cross-sectional view taken on line 3—3 of Fig. 1.
Figure 4:
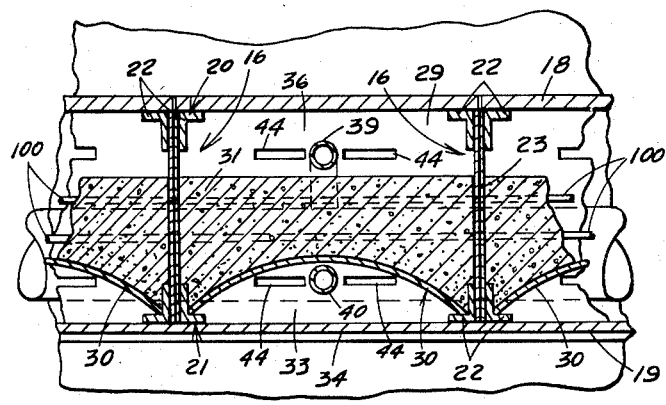
Fig. 4 is a cross-sectional view taken on line 4—4 of Fig. 1.
Figure 5:
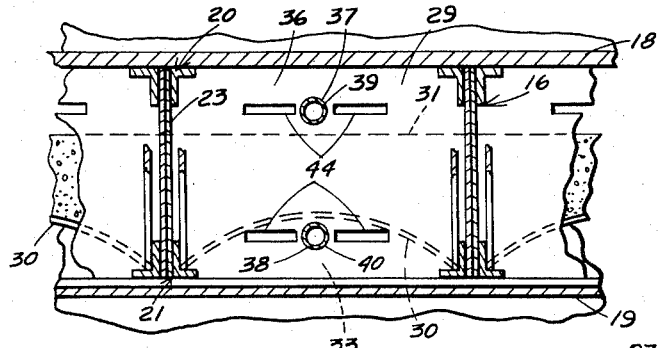
Fig. 5 is a cross-sectional view taken on line 5—5 of Fig. 1.

As can best be seen in Fig. 3, the bottom chord 21 of each joist 16 is interrupted to form an opening 24 therein near each end so that a hot water supply pipe 25 may be moved into and from the duct 17 along wall 11 and a hot water return pipe 26 may be similarly accommodated in the remaining duct 17 alongside wall 12. There are suitable truss rods or bars 27 arranged in a generally inverted V-formation between the top chord 20 and the portions of chord 21 on opposite sides of opening 24, the aforementioned pipes passing between said bars 27, and are thus disposed accessibly between the top and bottom levels of the joists. The cut-out portion forming the opening 24 at each end of each joist allows the pipes to lie relatively close to the ceiling level without interference with the angle members 22 of the bottom chord 21.

The grooves 14 in the building sidewalls are desirably lined on the bottom and vertical faces with an air impervious sheet 29 to minimize air pressure losses through the masonry work of the sidewalls.

Plates 29 extend between adjacent sides of adjacent joists 16 in uniformly spaced parallelism with the building sidewalls so that they collectively serve to define one side of each duct 17. A longitudinally extending arched sheet or pan 30 rests on or is inserted between the adjacent joists and the plates, and serves initially as a form for receiving a poured concrete sub-floor slab 31 which has a flat top surface 32 disposed appreciably below the top of the joists. The bottom face assumes the contour of the series of arched sheets 30 below which are inverted arched air channels 33 that are closed on the bottom by the ceiling sheets 34 which are fastened to the bottoms of the joists.

Floor paving slabs 18 on tops of the joists form the top of air channels 36 above slab 31. The plates 29 are provided with holes 37 above the top level of slab 31 and holes 38 beneath the arched sheets 30. Radiant heating pipes 39 and 40 pass through the channels 36 and 33 and are suitably connected at one end with hot water supply pipe 25, and at the other end with hot water return pipe 26. The plates 29 have narrow slots 44 affording opportunity for air flow therethrough only under conditions of air pressure differential between the ducts 17 on opposite sides of the building. The channels 33 and 36 are thus normally air locked until forced air circulation is set up through them. Under this normally air locked condition heat from pipes 39 and 40 may pass directly to floor paving 18 and ceiling 19 by radiation without the necessity of first heating the concrete mass of interfloor slab 31 to a degree at which it will begin to give off radiant heat. The sensible heat is thus speedily radiated to the rooms and with greater economy than in the known arrangement of embedded heating pipes within a concrete floor slab.

When room temperature requirements are satisfied and the flow of hot water is arrested in the pipes, the heat of the fluid at rest therein continues to radiate and compensate for heat losses from the rooms for a time depending on the rate of that loss from the building.

When the building heat loss is very low, as in moderate weather, and the aforesaid continued radiation is undesired in the rooms, that heat is carried away by setting up a directional air flow in the normally air-locked spaces wherein the pipes 25, 39, 40 and 26 are housed. The means for effecting the heat removal may include air cooling and air humidifying apparatus 41 of the motor driven blower or fan type, and having a supply duct 42 for cooled and humidified air leading from it to the duct 17 at the right hand side of Figs. 1, 2 and 3 and wherein the hot water supply pipe 25 is housed. The remaining duct 17 at the left hand side of said figures, and which duct houses hot water return pipe 26, has a return air duct 43 connecting it with air conditioner 41. A conduit 430 connects with return duct 43 and with the atmosphere outside the building, therefore providing for the introduction of outside air into the air which is circulated by apparatus 41, as rearranged and in known manner in the art. The restricted slots 44 in plates 29, which collectively form one longitudinal side-wall for each of ducts 17, serve to provide entry of the cool air from one duct 17 along pipes 39 and 40, on the one side and return the air with the heat from said pipes back into the opposite duct 17 and from thence to the air conditioner 41.

The conditioned air supply is available to provide fresh air in the rooms 45 by a suitable pipe 46 in the wall 11. A suitably controlled valve 47 is adapted to be opened as required by suitable means on demand for fresh room air independently of heat demand. Pipe 11 is in constant communication with the duct 17 at the right of Fig. 3.

The exit of stale room air may be by way of a pressure opening louvered exit 48 which is actuated by the pressure created in the room by the incoming pressure supply of conditioned air from pipe 46 when valve 47 is open.

It will be understood that the hot water (or steam) supply is of the forced circulation variety from a suitably fired heating plant 49 from which pipe 50 carries the heating medium (steam or water) to supply pipe 25 from whence it is carried via pipes 39 and 40 to return pipe 26. Pipe 26 connects with the boiler by means of pipe 51.

The heating plant 49 and the air conditioning plant 41 are desirably subject to automatic control, but may be otherwise suitably controlled in any fashion known in the art.

Figure 6:
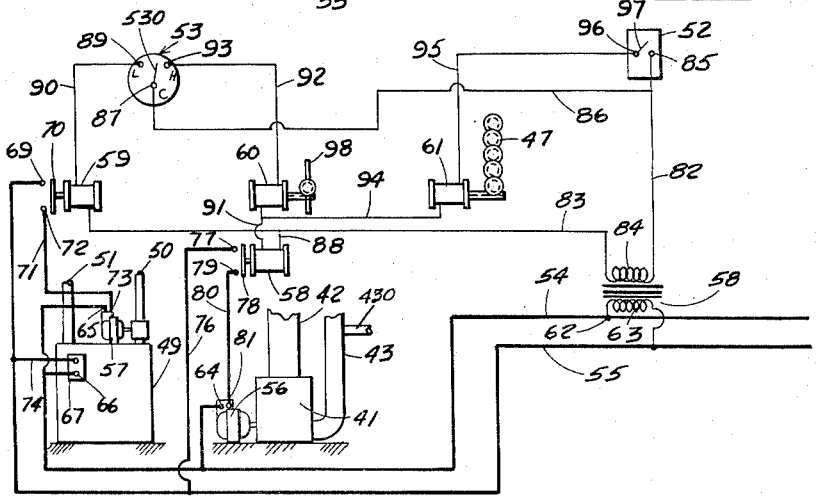
Fig. 6 is a wiring diagram for the automatic control of the system of the invention.

Fig. 6 shows an electrical wiring diagram of means for automatically controlling the temperature in the building and the air supply as such or as a control against heat over runs, or both.

A hygrometrically actuated electrical control device 52 and a high-low temperature thermostat 53 are both mounted conveniently in the interior of the building in the present embodiment of the invention. The house current lines 54 and 55 supply 110 volt A. C. current for the motors 56 and 57 of the air conditioner 41 and heating plant 49 respectively, and for a stepdown transformer that provides electrical energy for low voltage circuits to actuate the solenoids 58, 59, 60 and 61.

Conductor line 54 has connected thereto one terminal 62 of transformer primary winding 63, one terminal 64 of motor 56, one terminal 65 of motor 57 and one terminal 66 of a master control panel 67 of the heating apparatus 57. The master control panel 67 will be understood to carry additional electric terminals (not shown) for connection in known manner to the conventional electric safety and stand-by controls (not detailed) forming a part of a conventional heating plant such as 49. Conductor line 55 connects with the terminal 68 of winding 63 of the transformer 58, and with terminal 69 of normally open switch 70 that is operable by solenoid 59. A conductor 71 connects terminal 72 of switch 70 with terminal 73 of motor 57. Conductor 74 connects conductor 55 permanently with terminal 75 of master control panel 67. A conductor 76 forms an electrical connection between conductor 55 and terminal 77 of a switch 78 which is closed by solenoid 58. Terminal 79 of switch 78 is connected by conductor 80 to terminal 81 of motor 56.

The low voltage control circuits are arranged so that conditioned air may be caused to circulate into and out of the rooms to afford healthful atmosphere for the occupants according to hygrometric settings on instrument 52, or such air may be caused to circulate as a heat removing medium passing under the floor and over the ceiling. In the diagram (Fig. 6), low voltage conductors 82 and 83 are connected to opposite ends of secondary winding 84 of transformer 58. Conductor 82 is electrically connected to fixed contact 85 of hygrometrically controlled circuit closing instrument 52, and a conductor 86 connects conductor 82 with the moving contact terminal 87 of the high-low room thermostat 53. Conductor 83 is connected to one end of solenoid 58 by a wire 88 and said conductor 83 also connects with one end of solenoid 59. The remaining end of solenoid 59 is connected to the "low" terminal 89 of thermostat 53 by conductor 90. The remaining end of solenoid 58 is connected by wire 91 to one end of solenoid 60, while the remaining end of said solenoid 60 is connected by conductor 92 to the "high" terminal 93 of thermostat 53. A conductor 94 is electrically connected intermediate the ends of wire 91 and to one end of solenoid 61. The remaining end of solenoid 61 is connected to a conductor 95 which connects with terminal 96 of the moving contact 97 of instrument 52.

It will be noted that when a demand for humidified or otherwise conditioned air in the rooms of the building causes closing of the circuit in the instrument 52 solenoids 61 and 58 will be energized simultaneously so that air louver or valve 47 will open allowing the pressure of air in pipe 46 to introduce fresh or conditioned air into the room, as and so long as solenoid holds switch 78 closed for completing a power circuit including blower motor 56 of air conditioner apparatus 41 and said apparatus delivers air through air supply duct 42 into duct 17 at the right hand side of Fig. 3 which feeds the pipe 46. The stale air is exhausted to the outside of the building by way of opening 48 as the louvers 480 swing outwardly from a normally closed position by the force of increased pressure inside the room.

The radiant heating system is normally inoperative when the moving contact arm 530 is disposed out of contact with the "low" or heat demand terminal 89 of the thermostat 53. Upon demand for more heat in the rooms, arm 530 makes an electrical connection between terminals 87 and 89 and a closed circuit is established to energize solenoid 59 from secondary transformer winding 84, through conductor 83 to solenoid 59 and from solenoid 59 to terminal 89, through arm 530 to terminal 87 and thence by way of conductor 86 to conductor 82 back to secondary winding 84 of the transformer. When solenoid 59 is energized it closes switch 70 and a power circuit is completed to include the water pump motor 57 of heating apparatus 49 and hot water is forced through pipe 50 into pipe 25 and from it through each of the pipes 39 and 40 which empty into return pipe 26 and from it through pipe 51 to the boiler (not detailed) in the heating apparatus 49.

The power circuit to hot water pump motor includes power conductor 54 which connects with motor terminal 65 of motor 57 through the winding of said motor to terminal 73, thence through conductor 71 to terminal 72, through switch 70 to terminal 69 and returning through power conductor 55.

The power circuit for blower motor 56 is established from conductor 54, to terminal 64, through the winding of motor 56 to its terminal 81 thence through conductor 80, terminal 79, switch 78 and terminal 77 to conductor 76 which connects with conductor 55.

Figure 2:
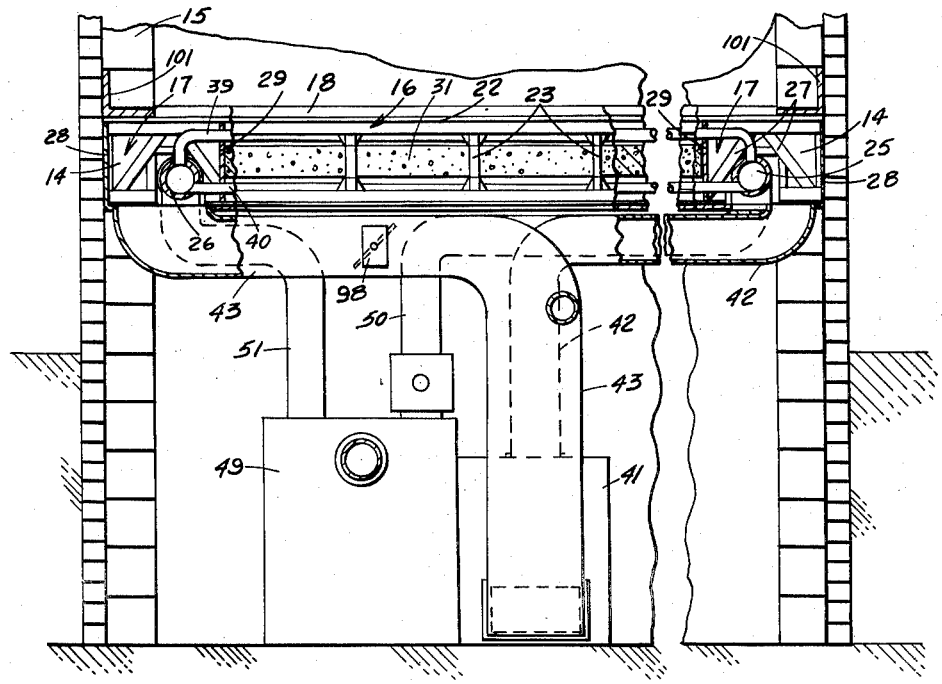
Fig. 2 is a cross-sectional view taken on line 2—2 of Fig. 1.

As can be best seen in Figs. 2 and 6, a normally closed damper or valve 98 is provided in return air pipe 43 and this is adapted to be opened by solenoid 60 whenever the thermostat arm 530 contacts the "high" terminal 93. At that time solenoids 58 and 60 are energized in series in a circuit including conductors 83, 88, 91, 92 to terminal 93 and returning through arm 530, terminal 87 and conductors 80 and 82. It will be noted when valve 98 is opened the pressure air flow set up by air conditioning apparatus passes through the air duct 42 to the right hand side of the building and is distributed throughout the length of duct 17 which carries water pipe 25. The air passes through the several slots 44 along the pipes 39 and 40 and out of the corresponding slots 44 at the opposite side of the building into the duct 17 on the last mentioned side of the building, and flows through return air pipe 43, past the open valve 98 and back to the air conditioner 41.

Should there be a demand for fresh room air during this operation, the solenoid 61 would also be actuated to operate valve 47 so that the supply of fresh conditioned air would flow at a lesser rate over the ceiling and under the floor and also through pipe 46 into the room. Upon satisfaction of the fresh air demand the instrument 52 would break the circuit to solenoid 61, permitting valve 47 to close while valve 98 remains open and motor 56 continues to force the air as a cooling medium for pipes 39 and 40 until arm 530 of thermostat breaks contact with contact terminal 93.

It is to be noted that ease of assembly of the heating water (or steam) circuit pipes is afforded by providing the openings or breaks 24 in the bottom chords 21 of the joists. The openings occur closely adjacent the inside face of the building side walls, and the pipes 25 and 26 are temporarily supported accessibly below the joists and the pipes 40 then connected to them, whereupon the assembled pipes 25, 26 and 40 may be raised into the openings 24 and into the arched spaces between the joists. Thereafter longitudinal plates 99 are suitably secured transversely across all chords 21 on opposite sides of the openings 24 therein. If the ceiling be in a dwelling apartment the plaster coating may be applied over plates 99 and the ceiling sheets 19 in order to present an even and uninterrupted finished ceiling. Where the decorative appearance of the ceiling is secondary, the plates 99 and their fastenings (not shown) may remain exposed. Suitable metal re-enforcing rods, bars or mesh 100 may be employed in the cast interfloor slab 31 in any suitable fashion to provide additional strength.

Angle irons 101 are disposed transversely across the top chords 20 of the joists, and the course of back-up or cinder blocks 15, which defines the top of the groove 17 in each building wall, is supported thereon.

In the winter season the air from apparatus 41, which is delivered on demand to the rooms via duct 42, the duct 17 at the right-hand side of Fig. 1 and the pipes 46, may be tempered by the heat of pipe 25 as it passes through the said duct 17 and over the said pipe 25 therein and discharges through one or more of the pipes such as 46. When there is a simultaneous "high" temperature condition in the inter-floor space and a demand for a change of room air, the room air is provided partly at the expense of the air flow through the channels housing the heating pipes 39 and 40. The effect however is that of replacing the warmer stale air in the room with cooler fresh air during the time in which some of the possibly unwanted heat is radiated to the room so that the room atmosphere remains entirely comfortable. The fresh air demand is usually satisfied in a comparatively short time, after which all of the circulating air volume is directed along pipes 39 and 40 to carry away unwanted heat as required.

The heating plant will be understood to be of the type commonly referred to as automatic and the details of its controls for maintaining a suitable supply of available hot water (or steam) form no part of the invention herein. The air conditioning apparatus may be of selected types to humidify, de-humidify and if desired cool the air by mechanical refrigeration seasonally and the details of its operation, beyond supplying conditioned room air and/or heat removal air as aforementioned form no part of the present invention.

While the embodiment herein illustrated shows a single apartment having one hot water (or steam) pipe 25 and one return pipe 26, it will be understood that the size and interior arrangement of the building structure may require multiples or variants in the arrangement of these pipes.

What is claimed is:

1. In a radiantly heated building structure having side walls, end walls, a floor bounded by said walls, and a ceiling below the floor and coextensive therewith, the combination of means intermediate said floor and ceiling arranged to provide a duct along each sidewall and form a shallow space between said ducts and below the floor, and another co-extensive shallow space in isolated relation to the first mentioned shallow space, immediately above the ceiling and intermediate the ducts, said spaces having restricted communication at opposite ends with said ducts, a hot water supply pipe housed in one of said ducts, and longitudinally co-extensive therewith, a correspondingly disposed water return pipe in the other of said ducts, a plurality of transversely extending pipes passing through the spaces below the floor and above the ceiling respectively and having their several opposite ends communicating with the hot water supply pipe and the water return pipe respectively, means including a source of hot water and a forced circulation means therefor for supplying hot water under pressure to the hot water supply pipe, and a pipe connecting the water return pipe with the source of hot water supply.

2. A radiant heating system for a building having sidewalls, a floor and a ceiling below said floor, said system comprising means providing a pair of parallel ducts intermediate the floor and ceiling and along the respective sidewalls, means disposed horizontally between adjacent sides of said ducts whereby a shallow horizontal space is provided immediately beneath the floor and an independent shallow space is provided immediately above the ceiling, a series of pipes extending through each of said shallow spaces and into the ducts, a hot water supply pipe disposed in one of said ducts and connected with the adjacent ends of all of pipes of said series, a water return pipe disposed in the remaining duct and having the remaining ends of the pipes of said series connected therewith, means selectively providing forced circulation of hot water through said pipes whereby radiant heat may be transmitted substantially unimpeded from the aforementioned pipes to the bottom of the floor and the top of the ceiling, a pressure air supply pipe connected to one of said ducts, a pressure air return pipe connected with the remaining duct, each of said ducts having a restricted communication with the several shallow spaces immediately adjacent each pipe of the series therein whereby said shallow spaces are normally substantially airlocked with relation to the respective ducts, and means for setting up forced air circulation in one of said ducts whereby pressure air is forced to flow along the series of pipes in the shallow spaces and into the remaining duct for exit therefrom through the air return pipe.

3. In a radiant heating system, the combination with a building structure having sidewalls, joists traversing the spaces between said sidewalls, and a floor and a ceiling connected respectively to the top and bottom respectively of the joists, of an inter floorslab traversing the joists and terminating at opposite edges in spaced parallelism with the sidewalls at a distance from opposite ends of the joists, the opposite ends of the joists being substantially open between the top and bottom chords thereof, whereby longitudinal ducts are formed between the said floor and ceiling along each sidewall and separate transverse channel spaces are formed between the ducts above and below said interfloor slabs, a series of parallel radiant heating pipes extending from one duct to the other duct through the channel spaces, a hot water supply pipe disposed longitudinally within one of said ducts, a water return pipe disposed longitudinally within the other of said ducts, said radiant heating pipes each connected at is opposite ends to said supply and return pipes respectively, a source of hot water supply, means comprising a feed pipe connected to said supply pipe, and a selectively operable pump for delivering hot water from the said source of supply under pressure into said supply pipe, a pipe connecting the return pipe to the said source of supply, and thermostatically operated means in the space between the sidewalls for controlling operation of the pump.

4. In a radiant heating system, the combination with a building structure having sidewalls, joists traversing the spaces between said sidewalls, and a floor and a ceiling connected respectively to the top and bottom respectively of the joists, of an interfloor slab traversing the joists and terminating at opposite edges in spaced parallelism with the sidewalls at a distance from opposite ends of the joists, the opposite ends of the joists being substantially open between the top and bottom chords thereof, whereby longitudinal ducts are formed between the said floor and ceiling along each sidewall and separate transverse channel spaces are formed between the ducts above and below said interfloor slab, a series of parallel radiant heating pipes extending from one duct to the other duct through the channel spaces, a hot water supply pipe disposed longitudinally within one of said ducts, a water return pipe disposed longitudinally within the other of the said ducts, said radiant heating pipes each connected at its opposite ends to said supply and return pipes respectively, a source of hot water supply, means comprising a feed pipe connected to said supply pipe, and a selectively operable pump for delivering hot water from the said source of supply under pressure into said supply pipe, a pipe connecting the return pipe to the said source of supply, plates extending from the floor to the ceiling and abutting the said opposite edges of the said interfloor slab, and having openings affording restricted communication between each duct and the opposite ends of the channels closely adjacent the radiant heating pipes, and means for selectively introducing cooling air under pressure to one of said ducts for passage therefrom through the restricted communicating openings in the several channels for cooling the radiant heating pipes in said channels and ducts.

5. In a building having a substantially closed space between a floor thereof and the ceiling below it, the combination of means dividing said space into a pair of laterally spaced ducts and vertically spaced transverse channels each having restricted communication at its ends with said pair of ducts, radiant heating pipes in the channels and having their ends extending into the ducts, supply and return pipes disposed respectively in said ducts and connecting with the extending ends of the radiant heating pipes, selectively operable means to supply a circulating heating medium under pressure to said supply pipe for passage through the radiant heating pipes whereby the floor and ceiling are heated, and selectively operable means to provide forced circulation of cooling air over said pipes in the ducts and channels housing said pipes for simultaneously cooling the pipes and curtailing the heating of the floor and ceiling.

6. In a building having sidewalls, a floor and a ceiling below said floor together defining a hollow interfloor space, the combination of a supply pipe and a return pipe in said space along opposed sidewalls, radiant heating pipes connected at opposite ends to said supply pipe and said return pipe, plates traversing the radiant heating pipes adjacent the junctions of the latter and the said supply and return pipes whereby the spaces around said supply and return pipes are substantially isolated from each other and the radiant heating pipes, said plates each having restricted apertures therethrough adjacent each radiant heating pipe, means to selectively produce a forced circulation of a fluid heating medium through the supply pipe and the connecting radiant heating pipes to said return pipe, means to effect a forced circulation of cooling air into the interfloor space between one building wall and the adjacent plates for movement through the restricted apertures along the radiant heating pipes, and thermostatically operating means controlling the circulating means for the fluid heating medium and the cooling air.

7. The combination with a pair of opposed building walls, a floor and a ceiling below said floor together forming a closed interfloor space, of a supply pipe and a return pipe disposed in said space along relatively opposite sides thereof, plate members along each of said pipes each forming a wall of a duct for the respective pipes and provided with restricted openings, the space between said walls of said ducts constituting a transverse channel space in normally air-locked relation to said ducts, a plurality of substantially parallel radiant heating pipes in the channel space having the opposite ends thereof passing through the respective duct walls adjacent the restricted openings and connected to the said supply and return pipes, means to supply pressure fluid heating medium to said supply pipe and from it to the radiant heating pipes whereby the floor and ceiling are uniformly heated, means to supply cooling air under pressure to one of said ducts for velocity travel through the restricted openings and across said channel space to the opposite duct, a valve controlling discharge of cooling air from the last mentioned duct whereby movement of air through the channel space may be arrested, a valve controlled conduit connecting the first mentioned duct and the space above the floor for directing pressure air into said space concurrently with or independently of the air flow through the channel space, and electrically operated, thermostatically controlled means for the pressure air supply means and the heating fluid supply means.

8. In combination with a pair of opposed building sidewalls having a floor and ceiling below it to form a hollow space between said walls, a plate structure in said space in parallelism with each sidewall forming ducts along each wall, a reenforced slab extending horizontally between the plate structures to form channels above and below the slab intermediate said ducts, a plurality of radiant heating pipes extending in parallelism through the channels into the ducts, pipes in the respective ducts, connecting with and providing a common supply and a common return line for the radiant heating pipes, means for effecting a pressure flow of fluid heating medium into the common supply line, said plate structures having restricted apertures therethrough adjacent each radiant heating pipe, means for providing a plenum pressure supply of cooling air to one of said ducts and a valve for controlling discharge from the other duct to selectively control the flow of cooling air through the channels from the first mentioned duct to the last mentioned duct through said restricted apertures in the plate structures.

9. In combination a building having a floor, a slab spaced below the floor to provide a traverse channel intermediate the slab and floor, plate structures having restricted apertures and substantially closing the channel at opposite ends, said plate structures defining ducts at opposite ends of the channel, a valve controlling discharge from one of said ducts and normally closed to effect an air-locked condition of the channel with respect to said ducts, means to deliver cooling air under pressure to the remaining duct, a valve controlled air pipe connecting said remaining duct with the space above the floor, a hot water supply pipe in said remaining duct, a radiant heating pipe connected to said supply pipe and extending through the channel and the plate structures at opposite ends thereof into the first mentioned duct, a hot water return pipe in the said first mentioned duct, means to selectively deliver hot water under pressure to said supply pipe, and an electrical control system for effecting joint and several operation of said valves and said air supply means at one time and for effecting simultaneous operation of said water supply means the air supply means and the valve controlling the air pipe which connects with the space above the floor at another time.

ELSON M. HARTER.

REFERENCES CITED

The following references are of record in the file of this patent:

UNITED STATES PATENTS

| Number | Name | Date |
| --- | --- | --- |
| 899,078 | Salmon | Sept. 22, 1908 |
| 1,995,481 | Myers | Mar. 26, 1935 |
| 2,240,951 | Hamjy | May 6, 1941 |
| 2,392,240 | Frankel | Jan. 1, 1946 |
| 2,442,201 | Elberty | May 25, 1948 |